United States Patent
Keyes

(10) Patent No.: US 6,355,207 B1
(45) Date of Patent: Mar. 12, 2002

(54) ENHANCED FLOW IN AGGLOMERATED AND BOUND MATERIALS AND PROCESS THEREFOR

(75) Inventor: John W. Keyes, St. Marys, PA (US)

(73) Assignee: Windfall Products, St. Marys, PA (US)

( * ) Notice: Subject to any disclaimer, the term of this patent is extended or adjusted under 35 U.S.C. 154(b) by 0 days.

(21) Appl. No.: 09/579,293

(22) Filed: May 25, 2000

(51) Int. Cl.[7] .................................................. B22F 1/00
(52) U.S. Cl. ................................ 419/10; 36/37; 75/252
(58) Field of Search ............................ 419/10, 36, 37, 419/62, 64, 65; 75/252

(56) References Cited

U.S. PATENT DOCUMENTS

| | | | |
|---|---|---|---|
| 4,983,355 A | | 1/1991 | Alfons |
| 5,480,469 A | * | 1/1996 | Storstrom et al. ............. 75/228 |
| 5,624,712 A | | 4/1997 | Shulman |
| 5,637,132 A | | 6/1997 | Matthews et al. |
| 5,650,088 A | | 7/1997 | Kodama |
| 5,740,872 A | | 4/1998 | Smith |
| 5,840,095 A | | 11/1998 | Kawamura et al. |
| 5,856,278 A | | 1/1999 | Brewer |
| 5,860,055 A | * | 1/1999 | Hesse et al. .................. 419/36 |
| 5,976,215 A | * | 11/1999 | Uenosono et al. ............. 75/252 |
| 5,977,033 A | * | 11/1999 | Lefebvre et al. ............. 508/551 |
| 5,989,304 A | * | 11/1999 | Ozaki et al. .................. 75/252 |

* cited by examiner

*Primary Examiner*—Ngoclan Mai
(74) *Attorney, Agent, or Firm*—Emch, Schaffer, Schaub & Porcello Co., L.P.A.

(57) ABSTRACT

In broad terms, this process adds organic material to particulate solids and works the mix. Resolification in a unique way creates improved binding of the particulate solids. The particulate solids are materials such as metal, semi-metal, ceramic, glass, plastic, or rubber, alloy, composite, agglomerate, or other organic. The organic selection should remain solid in handling and may become liquid during compaction. These materials may consist of a liquid, solid or mixture selected from the group consisting of fatty acids; and amides, bisamides, soaps and salts of fatty acids, waxes, resin, oils, hydrogenated fats and oils, polymers, mold release or friction reducing agent. With lubricity enough to enable ejection of a molded compact, flow and adequately low molecular weight and formulation to enable clean burn off if desired. With inputs that may include either pressure, solvents, chemical activation of polymers, or thermal heat; and working so as to enhance the gluing of particulates together and rounding of the agglomerate to provide flowability.

15 Claims, No Drawings

ENHANCED FLOW IN AGGLOMERATED AND BOUND MATERIALS AND PROCESS THEREFOR

TECHNICAL FIELD

This invention relates to enhancing the flow of agglomerates and bound materials utilizing organic materials. This invention also relates to a process for working particulate materials during agglomeration in a unique way.

BACKGROUND OF THE INVENTION

Agglomeration and binding materials is done to prevent the segregation of fine and course materials. Graphite or other alloys or alloy precursors in a fine form enhance dispersion within a greater matrix of 'iron' or other principle material or alloys. The particle size distribution is manipulated to attain desired performance under specific conditions. The formulation of agglomerates or filler material entails fabricability and processing considerations in addition to constituency selection.

In thermal, solvent, pressured, or activated polymer processing, the management of inputs during agglomeration or binding is critical to the achievement of a sound composite or agglomerate with out degrading the organic constituent. Insufficient inputs can cause poor bonding, porosity and irregular deposit configuration and segregation. These conditions are precursor to the formation of agglomerates having a greater disparity in compositions. Excess inputs produce dilution, fragmenting, and oxidation of the organic constituent. The effects of insufficient inputs on the sintering of the compacts made with these weak agglomerates or poorly bound materials include greater variation in production, distortion, voids, softening, or embrittlement. The effects of excess inputs during the formation of agglomerates include reduction in the effectiveness of the lubricant or mold release to aid in reduction of particle/particle or agglomerate/agglomerate friction during compaction. Increase in dusting, segregation in handling; and decrease in effectiveness in ejecting the compact from the die are problems that often occur during processing. They occur after pressing of the compact or during slurry filling of the cavities. They are the primary purpose of the mold release or lubricant in the first place.

With the aforementioned defined process, adding the working during processing attains the necessary rounded agglomerates; and enhanced flow characteristics.

The benefits of this greater flow-ability in traditional press and sinter is enhanced production speed, greater consistency in part to part production, as well as decrease in variation seen over time. This consistency is of paramount importance in decreasing the number of bad parts produced in any given manufacturing process using bound or agglomerated materials. Increasing speed of the manufacturing process during compaction and filling of cavities, decreasing capital equipment costs and labors necessary to produce parts also are achieved benefits.

BRIEF SUMMARY OF THE INVENTION

The composition and process of this invention eliminates these problems. In broad terms with particulate solids, adding organic material and working it upon resolidification in a unique way creates improved binding of the particulate solids. The particulate solids are materials such as metal, semi-metal, ceramic, glass, plastic, alloy, composite, agglomerate or other organic rubber. The organic selection should remain solid in handling and may become liquid during compaction. These materials may consist of a liquid, solid, or mixture selected from the group consisting of fatty acids; and amides, bisamides, soaps and salts of fatty acids; waxes, resins, oils, hydrogenated fats and oils, polymers, resins or mold release or friction reducing agents. With lubricity enough to enable ejection of a molded compact, flow, an adequately low molecular weight and formulation to enable clean burn off if desired. With inputs that may include either pressure, solvents, chemical activation of the polymers or resins, or thermal heat; and working so as to enhance the gluing of particulates together and rounding of the agglomerate to provide flowability.

In an example of thermal processing of a sample to be handled at room temperature, the preferred method makes a mix containing all ingredients that are to be used in this binding sequence. I then heat the mix above the melting point of the organic. As the temperature rises above the melting point, so does the materials chance for degradation increase. Keeping it slightly above its melting point for as little time as possible is a good thing for the organic. On the other hand as we raise the temperature and/or time the viscosity increases. This allows a greater wetting of the particulate surfaces and greater and more consistent distribution of the lubricant to be used as a binder. Generally working below the vapor or boiling or the lubricant and above its melting point is desirable. Preferably, the range is less then half the temperature difference between its boiling or vapor point and its melting point. Most preferably, I work as close to the melting point as possible, while still maintaining a liquid state when working and cooling begins to form the agglomerate. The heated material must be worked with a chilling device with the heat transfer potential to bring the mix down below its titer or softening point. This returns the binder to a solid. The motion or work forms rounded or more spherical agglomerates. This enhances the flowability of the agglomerates after cooling. After the chilling step, the mix can be screened to reduce the range of the agglomerates and create an even more consistent flow.

DETAILED DESCRIPTION OF THE INVENTION

In thermal processing, the process step of heating the mix means heating above the melting point of the organic material. The process includes the steps of using heated material so that upon cooling, it freezes and "glues the particles together". By taking heated material and working it during cooling, the creation of rounded agglomerates is possible. Extending the subsequent heating and cooling to multiple materials with tiered melting points allows for paired or coupled pre-alloys to be distributed within the greater bound mix.

Other methods include the following steps. Multiple binding levels using multiple materials with tiered melting points. Examples used are pre-bound mixes, which will ultimately allow precursors of complex inter-structural alloys to form within the matrix of a component (multi-matrix composites). This allows for paired of coupled pre-alloys to be distributed within a greater bound mix. Using solvents of pressure instead of heating to force the wetting of the lubricant made binder also is possible. In addition, I can use chemical activation of the polymers or resins.

Solvent activation refers to the organic material dissolved in a solvent with the particulate solids. The preferred process includes the steps of using solvents so that upon evaporation of the solvent, it glues the particles together. This process takes materials that have had the organic portion dispersed in a solvent and works them during evaporation of the solvent in such a way as to form rounded agglomerates.

Pressured material refers to either adding or reducing the pressure of an organic material with particulate solids. At atmospheric pressures, this process includes the steps of using pressured material so that it phase changes into a liquid or vapor and re-solidifies upon returning to atmospheric or room pressure "gluing the particles together". The process also includes taking pressured material and working it during re-solidification or its return to atmospheric or room pressure in such a way that the creation of rounded agglomerates is possible.

Chemically activating the polymers or resins and working the mix also forms rounded agglomerates.

The organic lubricant or binder may consist of a liquid, solid, or mixture selected from the group consisting of fatty acids; and amides, bisamides, soaps and salts of fatty acids; waxes, resins, oils, hydrogenated fats and oils, polymers or mold release or friction reducing agent. With lubricity enough to enable ejection of a molded compact, flow, an adequately low molecular weight and formulation to enable clean burn off is desired.

In one aspect, this invention relates to powder metallurgy compositions containing elemental and/or pre-alloyed non-ferrous metal powders, organic lubricants, with or without flake graphite additive. For example, pre-blended bronze compositions are commonly used for self-lubricating bearing and bushings, oil impregnated bearings for motor use, household appliances, tape recorders, video cassette recorders, etc. In commercial powder metallurgy practices, powdered metals are converted into a metal article having virtually any desired shape.

The metal powder is firstly compressed in a die to form a "green" pre-form or compact having the general shape of the die. The compact sintered at an elevated temperature to fuse the individual metal particles together into a sintered metal part having a useful strength and yet still retaining the general shape of the die in which the compact was made. Metal powders utilized in such processes are generally pure metals, or alloys or blends of these and sintering will yield a component having between 60% and 95% of the theoretical density. If particularly high-density low porosity is required, then a process such as hot isostatic pressing, explosive compaction, or double mold double sinter may be utilized. Bronze alloys used in such processes comprise a blend of approximately 10% of tin powder and 90% of copper powder and according to one common practice the sintering conditions for the bronze alloy are controlled that a predetermined degree of porosity remains in the sintered part. Such parts can then be impregnated with oil under pressure or vacuum to form a so-called permanently lubricated bearing or component. These parts have found wide application in bearing and motor components in consumer products and eliminate the need for periodic lubrication of these parts during the useful life of the product. Solid lubricants can also be included and these are typically waxes, metallic/non-metallic stearate, graphite, lead and tin alloys, molybdenum disulfide and tungsten disulfide, bismuth as well as many other additives. However, the powders produced for use in powder metallurgy have typically been commercially pure grades of copper powder and tin powder which are then mixed in the desired quantities.

For many metallurgical purposes, the resulting sintered product has to be capable of being machined that is to say it must be capable of being machined without either "tearing" the surface being machined to leave a "rough" surface or without unduly blunting or binding with the tools concerned. It is the common practice for a proportion of lead, tin, MnS, or other solid lubricant up to 10% to be introduced to aid and improve the machine-ability of the resulting product.

Metallic binders such as cobalt, zirconium, tin, copper, silver, gold, bismuth can hold higher melting point particulates together into a composite. Application can be whole particles having a single chemistry, examples being a metallic carbide of tungsten, silicon, titanium, or other hard materials such as diamond like materials, glasses, oxides, nitrates, and other similar substances; or processed particles having a deposition, film, or surface modification. Examples of this second class of materials include a material which is only moderately hard, having a hardness which in itself is not sufficient. In this case, a deposition, film or surface modification may be used examples being electroplating, ion beam, physical or chemical vapor deposition. Besides obtaining a greater particle surface hardness, a composite of greater hardness can be achieved utilizing materials made with particles processed in this way. Among the materials of greater hardness that can be deposited by means of a physical or chemical vapor deposition include silicon-carbides, the carbides and nitrites of metals especially transition metals including and the form of carbon with cubic crystallographic lattice and others such as cubic-boron-nitrate. There are many known processes for the physical or chemical deposition by vapor which can be used to obtain a layer of silicon carbide, or of other material of greater hardness. Among these processes, the ones that are particularly advantageous are CVD, PVD, PE-CVD. Once again agglomerates can be formed utilizing either or both of these particulates with a metallic binder by adding an organic material, heating the mixture to a temperature above the melting temperature of the organic material; maintaining the temperature above the melting temperature of the organic material; and slowly cooling and simultaneously working the heated mixture to below the softening point of the organic material to coat the particles with the metal binder and form rounded agglomerates.

One example is the case of thermal activation of metallic binders such as cobalt, and zirconium is used with tungsten carbide. It is useful to disperse the binder as a film over the particles and agglomerate to prevent segregation. Intermediary agglomeration using organic material may be used to "glue the metallic binders to the hard materials". Adding an organic material and heating the mixture to a temperature above the melting temperature of the organic material; maintaining the temperature above the melting temperature of the organic material; and slowly cooling and simultaneously working the heated mixture to below the softening point of the organic material forms rounded agglomerates of the cooled mixture. The difficulty of handling and transferring hard, coarse and sharp materials is greatly aided by use of rounding agglomerates made from these products. After the organic material aids in reducing particle/particle or agglomerate/agglomerate friction and the parts release from the mold. Subsequent processing will reduce the organic materials and melt the metallic binder so that it glues the hard particles together in the compact.

In another aspect, this invention relates to powder metallurgy compositions containing elemental and/or pre-alloyed non-ferrous metal powders with organic lubricants. For example pre-blended aluminum powders are used for their ability to oxidize, workability, conductivity, as pigments and glitters, or relative lightness when compared to steel. Uses include fuel cells, household appliances, pigments, and foils, sprayed onto plastic to decrease permeability or escape of rare gases, or decrease the introduction of air into products such as food. In commercial powdered metallurgy practices flame spray or conversion into a metal article having virtually any desired shape.

In conventional press and sinter manufacturing the powder or agglomerates are firstly compressed in a die to form a "green" pre-form or compact having the general shape of the die. The compact is then sintered at an elevated temperature to fuse the individual agglomerates or metal particles together into a sintered metal part having a useful strength and yet still retaining the general shape of the die in which the compact was made. Metal powders utilized in such a processes are generally pure metals, or alloys or blends of these and sintering will yield a component having between 60% and 95% of the theoretical density. If particularly high-density low porosity is required, then processes such as hot isostatic pressing or explosive compaction may be required.

Aluminum alloys used in such processes comprise a blend of aluminum with one or more other elements or alloys such as boron, bismuth, chromium, copper, iron, magnesium, sodium, nickel, lead, silicon, tin, strontium, titanium, zinc, zirconium.

The cooling or chilling of this invention may vary widely. Typically the cooling depends upon the melting and softening temperature of the organic material. I prefer that the cooling be as rapid as possible. Often, the cooling occurs in less than one minute and could be only a few seconds. However, the cooling may take as long as a few minutes; e.g. up to 5 minutes. Cooling may even take hours or days depending upon the materials.

EXAMPLE I

In attempting to mold a cam shaft cover, weight 24.0 grams with Alcoa 201 AB and holding a 0.40 gram weight tolerance, the following was observed.

Alcoa 201 AC is a blend comprised of #1202 Aluminum which is air atomized in Texas; #3014 a 50/50 copper/Aluminum master alloy is also atomized in Texas; elemental magnesium, and Acrawax C atomized as a lubricant.

| The blend contains | Min | Max |
|---|---|---|
| #1202 aluminum | 93.60% | 98.70% |
| #3014 50/50 aluminum/copper | 0.25% | 4.4% |
| Magnesium | 0.5% | 1.0% |
| With organic lubricant | 1.5% | |
| Trade name Acrawax aka | | |
| N,N'-Ethylenebisstearamide 65% \ | | |
| N,N'-Ethylenepalmitamide 35% > | | |
| Fatty Acid (C14–18) 2% / | | |

| | | | Mesh size | | | |
|---|---|---|---|---|---|---|
| Material | +50 | +100 | +200 | +325 | −325 | ~5 microns |
| 1202 Aluminum | 0.2% max | 18–22% | 26–29% | 16–20% | 27–40% | |
| 3014 50/50 copper/alum | | 0.2% max | | | 75–90% | |
| Magnesium | | | | | 100% | |
| Acrawax | | | | | 100% | 50% |

| Press Speed | Alcoa 201 AB as received Grams of variation in set of 30 | Alcoa 201 AB Processed For agglomeration and flow Grams of variation in group of 30 |
|---|---|---|
| 7–8 | .58 | |
| 10 | 6.07 | .22 |
| 14 | | .31 |
| 20 | | .44 |

The mix was heated in the chamber in inert atmosphere to a temperature above the melting point of the Acrawax in this case 180° C. for 5 minutes (Acrawax melts at 145° C.). Acrawax has a boiling point of about 415° C. Working the material during cooling produced rounded agglomerates. The working and cooling was carried out for a period of time less than 1 minute. Acrawax is a registered trademark of Glyco Inc.

EXAMPLE II

Another example of a sample holding —100 mesh of Ampal was made according to the procedure of Example I. This was a standard operating size so no changes were required to production.

| The blend contains | Min | Max |
|---|---|---|
| Aluminum | 93.60% | 98.70% |
| Copper | 3.6% | 4.0% |
| Magnesium | 0.8% | 1.2% |
| Silicon | 0.65% | 0.9% |
| With organic lubricant | 1.5% | |
| Trade name Acrawax aka | | |
| N,N'-Ethylenebisstearamide 65% \ | | |
| N,N'-Ethylenepalmitamide 35% > | | |
| Fatty Acid (C14–18) 2% / | | |

| | | | Mesh size | | | |
|---|---|---|---|---|---|---|
| Material | +50 | +100 | +200 | +325 | −325 | ~5 microns |
| Aluminum | 1.0% max | 25–45 | 30–50 | 20–40 | | |
| Copper | | | | | 100% | 18–24 |
| Magnesium | | | | | 100% | 18–24 |
| Silicon | | | | | 100% | 18–24 |
| Acrawax | | | | | 100% | 5–6 |

| Press Speed | Ampal 2712 processed For agglomeration and flow Grams of variation in group of 30 |
|---|---|
| 10 | .18 |
| 14 | .16 |
| 20 | .22 |

EXAMPLE III

A metallurgic bronze powder system comprised of 90% elemental copper and 10% elemental tin was pre-alloyed, atomized and reduced to a powder. The bronze powder and Acrawax—C atomized the lubricant to be made a binder, were loaded into a crucible or melting chamber. The mix was heated in the chamber in inert atmosphere to a temperature above the melting point of the Acrawax in this case 180 C. for a 5 minutes (Acrawax melts at 145 C.). Working the material during cooling produced rounded agglomerates.

The results show a greater consistency of die filling due to binding and flow-ability of the mix. Larger particles usually accompany higher permeability allowing for greater flow rates. Agglomerate shape dictates the mixes free motion. The agglomerate ability to roll past other agglomerated particles.

The results also show binding retards sifting segregation and facilitates greater homogeneity of alloy distribution regardless of particle size. This narrows the range of strength of a compact as measured across a narrow cross-section hence increasing strength as measured from the lesser number. Less distortion of deformation of the component also is seen after sintering.

Multiple pre-bound materials mixed together to allow for creation of alloy pins, inclusions, nodes and structure within a greater component is also possible, in addition to multiple matrix components.

The process has less dusting which helps with equipment uptime due to cleanliness, consistency of die filling, housekeeping, health, benefits due to reduction of nuisance dust and the reduction of potential explosions due to air borne oxidizing or reactive materials. The agglomerates may also be ionized facilitating transfer to or from a charged target.

Lubricant as a binder, reduction of particle/particle or agglomerate/agglomerate friction during compaction and reduction of die wall friction during ejection occurs, over a process using less lubricant and more binder. Indications are that typically compressibility is decreased slightly, the lubricant is now fixed by the process and not free flowing. If the temperature of the tools are below the melting point of the bound lubricant and it achieves liquid state during compaction; compressibility is restored as the lubricant is dislocated and the bound lube is squeezed out to the die wall where it may better aid in ejection after compaction. These relatively chilled tools must freeze the binder and with subsequent relative cooling protect the part from free mix sticking to the part.

In addition to these embodiments, persons skilled in the art can see that numerous modifications and changes may be made to the above invention without departing from the intended spirit and scope thereof.

I claim:

1. A process for producing rounded agglomerates comprising the steps of providing a mixture of particulate solids and organic material; heating the mixture at a temperature above the melting temperature of the organic material but below the vapor point of the organic material; maintaining the temperature above the melting temperature of the organic material for as little time as possible and rapidly cooling and simultaneously working the heated mixture to below the softening point of the organic material to form rounded agglomerates of the cooled mixture.

2. A process according to claim 1 wherein the particulate solids is metal, semi-metal, ceramic, glass, plastic, rubber, alloy, composite, agglomerate or other organic rubber.

3. A process according to claim 1 wherein the heating is maintained at a temperature below less than one half of the range between the vapor point and the melting point of the organic material.

4. A process according to claim 3 wherein the heating is maintained at a temperature below less than one quarter of the range between the vapor point and the melting point of the organic material.

5. A process according to claim 4 wherein the heating is maintained at a temperature below less than one tenth of the range between the vapor point and the melting point of the organic material.

6. A process according to claim 5 wherein the heating is maintained at a temperature slightly above the melting point of the organic material.

7. A process according to claim 1 wherein the working and cooling are carried out for a period of time of 5 minutes or less.

8. A process according to claim 1 wherein the working and cooling are carried out for a period of time of less than one minute.

9. A process for producing rounded agglomerates comprising the steps of providing particulate solids; heating the solids to a temperature above the melting temperature of an organic material but below the vapor point of the organic material, then adding the organic material while maintaining the temperature of the particulates above the melting temperature of the organic material for as little time as possible to form a heated mixture; and rapidly cooling and simultaneously working the heated mixture to below the softening point of the organic material to form rounded agglomerates of the cooled mixture.

10. A process according to claim 9 wherein the heating is maintained at a temperature below less than one half of the range between the vapor point and the melting point of the organic material.

11. A process according to claim 9 wherein the heating is maintained at a temperature below less than one quarter of the range between the vapor point and the melting point of the organic material.

12. A process according to claim 9 wherein the heating is maintained at a temperature below less than one tenth of the range between the vapor point and the melting point of the organic material.

13. A process according to claim 9 wherein the heating is maintained at a temperature slightly above the melting point of the organic material.

14. A process for producing rounded agglomerates comprising the steps of providing a mixture of particulate solids, pre-agglomerated particulates of particulate solids and a first organic material, and a second organic material; heating the mixture at a temperature above the melting temperature of the second organic material, and below the melting point of the first organic material used in making the pre-agglomerated particulates; maintaining the temperature above the melting temperature of the second organic material, and below the melting point of the first organic material used in making the pre-agglomerated particulates; and rapidly cooling and simultaneously working the heated mixture to below the softening point of the first and second organic materials to form rounded agglomerates of the cooled mixture.

15. A process for producing rounded agglomerates comprising the steps of providing a mixture of particulate solids and pre-agglomerated particulates of particulate solids and a first organic material; heating the mixture to a temperature above the melting temperature of a second organic material that is to be introduced, but below the melting temperature of the first organic material used in making the pre-agglomerated particulates; then adding the second organic material and maintaining the temperature of the particulates above the melting temperature of the second organic material; and rapidly cooling and simultaneously working the heated mixture to below the softening point of the first and second organic materials to form rounded agglomerates of the cooled mixture.

* * * * *